United States Patent
Littell

(10) Patent No.: US 9,616,988 B2
(45) Date of Patent: Apr. 11, 2017

(54) ENERGY-ABSORBING BEAM MEMBER

(71) Applicant: The United States of America as represented by the Administrator of the National Aeronautics and Space Administration, Washington, DC (US)

(72) Inventor: Justin D. Littell, Williamsburg, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 188 days.

(21) Appl. No.: 14/612,659

(22) Filed: Feb. 3, 2015

(65) Prior Publication Data

US 2015/0225063 A1     Aug. 13, 2015

Related U.S. Application Data

(60) Provisional application No. 61/938,749, filed on Feb. 12, 2014.

(51) Int. Cl.
     *B64C 1/18*        (2006.01)
     *B64C 1/06*        (2006.01)

(52) U.S. Cl.
     CPC ............... *B64C 1/062* (2013.01); *B64C 1/18* (2013.01)

(58) Field of Classification Search
     CPC .... B64C 1/062; B64C 1/18; F16F 7/12; F16F 7/121; F16F 7/122; F16F 7/124
     See application file for complete search history.

(56) References Cited

U.S. PATENT DOCUMENTS

| | | | | |
|---|---|---|---|---|
| 4,084,029 A | * | 4/1978 | Johnson | B64C 3/187 156/210 |
| 4,734,146 A | * | 3/1988 | Halcomb | B29C 69/003 156/148 |

(Continued)

OTHER PUBLICATIONS

Annett, Martin et al., "Evaluation of the Transport Rotorcraft Airframe Crash Testbed (TRACT) Full Scale Crash Test," Proceedings from the FAA, Seventh Triennial International Fire & Cabin Safety Conference Presentation Slides, Dec. 2-5, 2013, pp. 1-27.

(Continued)

*Primary Examiner* — Tien Dinh
*Assistant Examiner* — Richard R Green
(74) *Attorney, Agent, or Firm* — Andrea Z. Warmbier

(57) ABSTRACT

An energy-absorbing (EA) beam member and having a cell core structure is positioned in an aircraft fuselage proximate to the floor of the aircraft. The cell core structure has a length oriented along a width of the fuselage, a width oriented along a length of the fuselage, and a depth extending away from the floor. The cell core structure also includes cell walls that collectively define a repeating conusoidal pattern of alternating respective larger and smaller first and second radii along the length of the cell core structure. The cell walls slope away from a direction of flight of the aircraft at a calibrated lean angle. An EA beam member may include the cell core structure and first and second plates along the length of the cell core structure on opposite edges of the cell material.

20 Claims, 3 Drawing Sheets

(56) References Cited

U.S. PATENT DOCUMENTS

| | | | | |
|---|---|---|---|---|
| 6,520,716 B2* | 2/2003 | Rower | ............... | E01C 19/42 |
| | | | | 404/104 |
| 6,948,684 B2* | 9/2005 | Beral | ............... | B64C 1/062 |
| | | | | 244/117 R |
| 8,292,227 B2* | 10/2012 | Stuhr | ............... | B64C 1/12 |
| | | | | 244/123.1 |

OTHER PUBLICATIONS

Price, J. N. et al., "Axial Crushing of Glass Fibre-Polyester Composite Cones," Composites Science and Technology, 1987, vol. 28, pp. 211-230.

Feraboli, Paolo et al., "Design and Certification of a Composite Thin-walled Structure for Energy Absorption," International Journal of Vehicle Design, 2007, vol. 44, No. 3/4. pp. 247-267.

Gupta, N. K. et al., "Axial Compression of Empty and Foam Composite Conical Shells," Journal of Composite Materials, 1999, vol. 33, No. 6, pp. 567-591.

Fleming, David C. et al., "Tapered Geometries for Improved Crashworthiness Under Side Loads," Journal of the American Helicopter Society, Jan. 1993, pp. 38-44.

Farley, Gary L. et al., "Energy-Absorption Capability of Composite Tubes and Beams," NASA TM 101634, Sep. 1989, pp. 35-154.

Feraboli, Paolo, "Development of a Corrugated Test Specimen for Composite Materials Energy Absorption," Journal of Composite Materials, 2008, vol. 42, No. 3, pp. 229-256.

Farley, Gary L., "A Method of Predicting the Energy-Absorbing Capability of Composite Subfloor Beams," NASA TM 89088, Mar. 1987, pp. 1-19.

Johnson, A. F. et al., "Crash Resistant Composite Subfloor Structures for Helicopters," Proceedings from the AGARD Conference—Advances in Rotorcraft Technology Symposium, May 27-30, 1996, pp. 14-1-14-12.

American Society for Testing and Materials, "Standard Test Method for Tensile Properties of Polymer Matrix Composite Materials," 2008, ASTM-D3039M, pp. 1-13.

American Society for Testing and Materials, "Standard Test Method for In-Plane Shear Response of Polymer Matrix Composite Matrials by Tensile Test of a ±45° Laminate," 2013, ASTM-D3518M, pp. 1-7.

Lee, S. et al., "Evaluation of Three In-Plane Shear Test Methods for Advanced Composite Materials," Composites, Nov. 1990, pp. 495-502, vol. 21, No. 6.

Morthorst, Marion et al., "Crushing of Conical Composites Shells: A Numerical Analysis of the Governing Factors," Aerospace Science and Technology, 2005, pp. 127-135, vol. 10.

Smith, Robert, "Energy Absorption of Sine Wave Beams Subjected to Axial Impact Loading," Master of Science Mechanical Engineering Thesis, Mar. 3, 2007, pp. 1-101, Purdue University.

Wang, B. et al., Abstract, "Crashworthiness Analysis and Optimization of Sine Wave Beams," APCOM 5th Annual Conference Proceedings, Dec. 11-14, 2013, Singapore.

* cited by examiner

ENERGY-ABSORBING BEAM MEMBER

CROSS-REFERENCE TO RELATED APPLICATIONS

This application claims the benefit of U.S. Provisional Patent Application No. 61/938,749, filed on Feb. 12, 2014, which is hereby incorporated by reference in its entirety.

STATEMENT REGARDING FEDERALLY SPONSORED RESEARCH OR DEVELOPMENT

The invention described herein was made by an employee of the United States Government, and may be manufactured and used by or for the Government for Government purposes without the payment of any royalties thereon or therefor.

TECHNICAL FIELD

The present disclosure relates to an energy-absorbing beam member that can be used in an aircraft.

BACKGROUND OF THE INVENTION

Modern aircraft fuselages are constructed using annular frame members that are interconnected along a length of the fuselage using longitudinal and transverse beam members. Collectively, the various frame and beam members support the overall load of the airframe. In an aircraft fuselage, the longitudinal members, often referred to as "longerons" or keel beams in different fuselage designs, are attached to the annular frame members. The longitudinal beam members serve to transfer aerodynamic loads acting on the outer fuselage skin to the annular frame members. The transverse beam members in turn are arranged orthogonally with respect to the longitudinal beam members to span the fuselage. The ends of the transverse beam members are fastened to the longitudinal beam members to provide support for a fuselage floor as well as seats, equipment, or cargo transported via the floor.

There is a need for a transverse beam member having improved crush and shear performance in response to an impact event having forward and vertical velocity components. Conventional aircraft beam members use metallic shear panels or sacrificial structural elements that tend to bend, buckle, and ultimately fracture to absorb an impact load. Transverse beam members used as fuselage subfloor structures are designed to provide a desired amount of planar stability, i.e., stability in a planar direction of any cell materials forming the beam members. Conventional cell materials may include sinusoidal, corrugated, conventional I-beam, and sandwiched cell materials. However, such designs are less than optimal in terms of providing overall lateral strength and resistance to shear loading in the presence of an impact event having vertical and horizontal velocity components. Additionally, conventionally constructed transverse beam members lack a suitable internal load-triggering mechanism as provided herein.

BRIEF SUMMARY OF THE INVENTION

An energy-absorbing (EA) beam member is disclosed herein having a conusoidal cross-section suitable for attenuating an impact load having vertical and horizontal velocity components. As used herein, the term "conusoidal" refers to an alternating pattern of a predetermined conical geometry, with alternating large and small radii which collectively provide an internal triggering mechanism when the EA beam member is subjected to an impact load.

When viewed from an end of the EA beam member, the conical cell walls are sloped away from the direction of flight to define a calibrated lean angle that helps provide improved resistance to forward shear loading. This in turn increases the stability of the EA beam member during an impact event in which there is a forward velocity component, for instance in the example scenario of a hard landing of a rotary aircraft while moving at a positive ground speed. The non-uniform cross section of the conusoidal design thus stands in contrast to prior art designs described above with uniform cross sections through the entirety of their depths or thicknesses.

In a particular embodiment, an aircraft includes a fuselage, a floor, and an energy-absorbing (EA) beam member. The fuselage has a width and a length. The EA beam member is positioned adjacent to the floor and has a conusoidal cell core structure. The conusoidal cell core structure has a length oriented along the width of the fuselage, a width oriented along the length of the fuselage, and a depth extending away from the floor. The conusoidal cell core structure also includes cell walls that collectively define a repeating conusoidal pattern of alternating larger and smaller first and second radii along the length of the cell core structure. The cell walls slope away from a direction of flight of the aircraft at a calibrated lean angle.

The calibrated lean angle is more than about 2 degrees in an example embodiment. The first radii may be at least 10 percent smaller than the second radii, with such a size difference helping to provide a suitable triggering mechanism as set forth herein.

The cell core structure may be constructed of woven carbon and aramid fibers, e.g., KEVLAR. For instance, carbon and aramid fibers may be arranged in different layers, such as four layers, with the respective longitudinal axes of the carbon and aramid fibers arranged orthogonally with respect to each other.

The above features and advantages and other features and advantages of the present disclosure are readily apparent from the following detailed description of the best modes for carrying out the disclosure when taken in connection with the accompanying drawings.

DETAILED DESCRIPTION OF THE INVENTION

Figure 1:
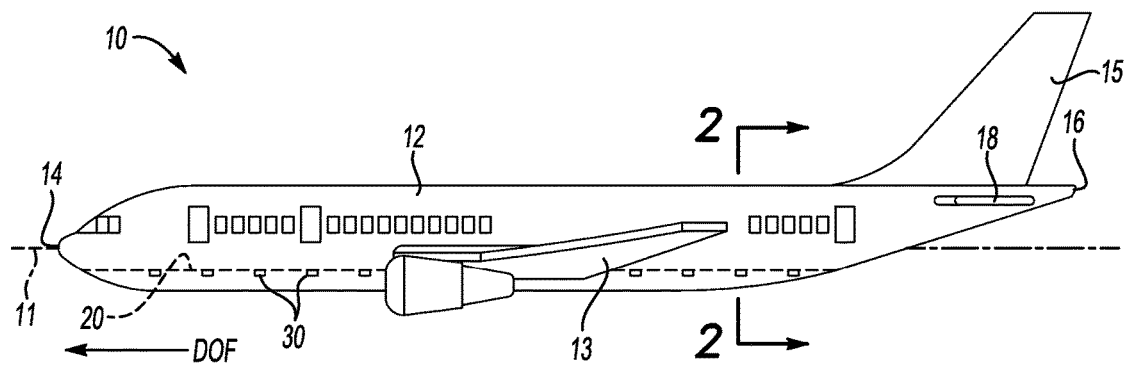
FIG. 1 is a schematic side view illustration of an example aircraft having a transverse energy-absorbing (EA) beam member as set forth herein.

Referring to the drawings, wherein like reference numbers refer to the same or similar components in the various Figures, an example aircraft 10 is shown schematically in FIG. 1 having a normal direction of flight (arrow DOF). While depicted as a winged aircraft in the form of a fixed wing jet-powered airplane, the aircraft 10 may be alternatively configured as a rotary aircraft or any other vehicle that can experience an impact event having both vertical and horizontal velocity components. For illustrative simplicity, the example aircraft 10 of FIG. 1 will be described hereinafter without limiting applications to such an aircraft.

The aircraft 10 includes a generally cylindrical fuselage 12 having a longitudinal axis 11 extending from a front 14 to a rear 16 of the aircraft 10, wings 13, a tail 15, and stabilizers 18. A floor 20 of the fuselage 12 extends within the fuselage 12. As is known in the art, the floor 20 may be embodied as a set of floor panels or plates of aluminum or another suitable lightweight material configured to support passenger seats, cargo, and the like.

Figure 2:
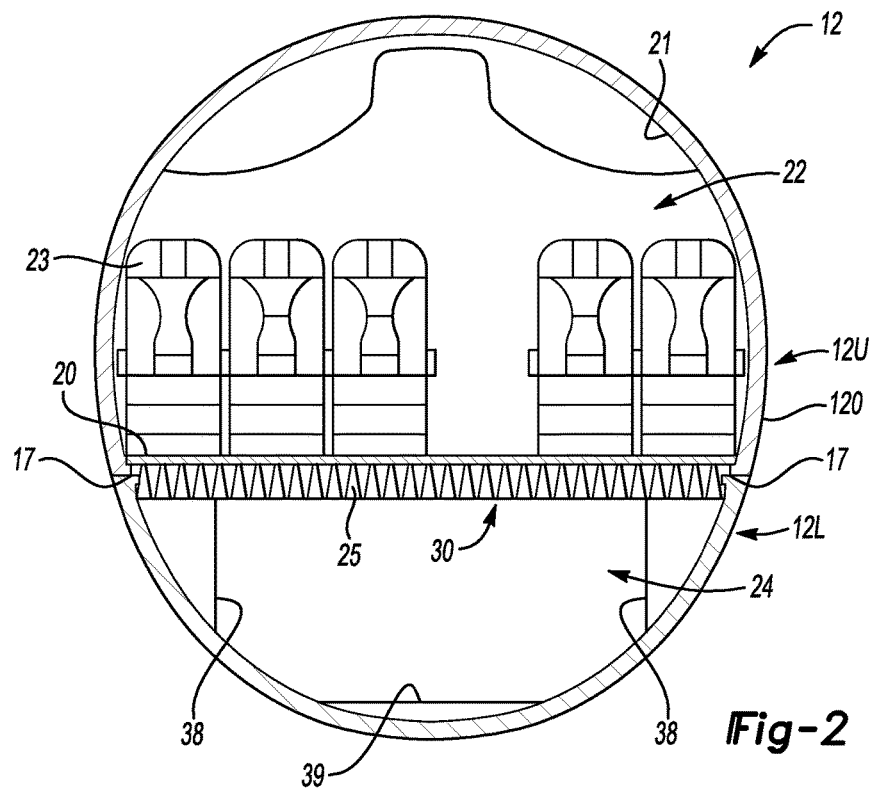
FIG. 2 is a schematic partial cross-sectional front view illustration of a fuselage of the aircraft shown in FIG. 1.
Figure 3A:
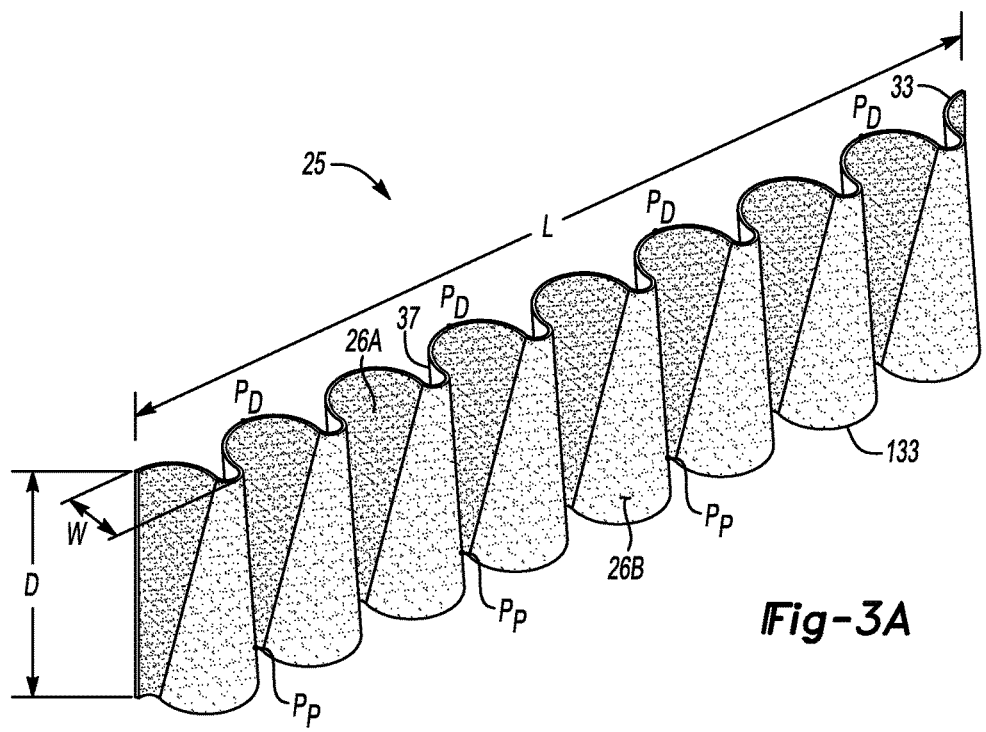
FIG. 3A is a schematic perspective view illustration of cell core structure usable as part of the EA beam member described herein.
Figure 3B:
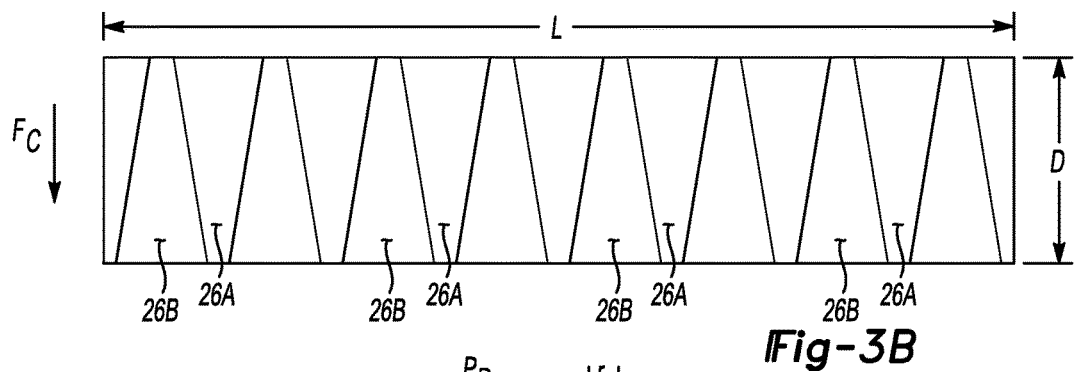
FIG. 3B is a schematic plan view illustration of the cell core structure of FIG. 3A.
Figure 3C:
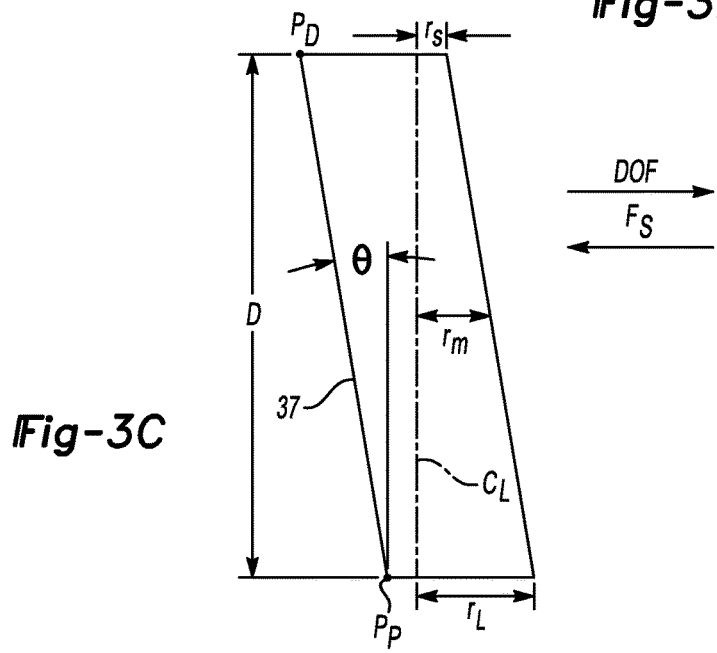
FIG. 3C is a schematic side view illustration of the cell core structure of FIGS. 3A and 3B.

The fuselage 12 includes one or more energy-absorbing (EA) beam members 30 constructed with a conusoidal cell core structure 25 as best shown in FIGS. 2-3C. The EA beam members 30 may be arranged orthogonally with respect to the longitudinal axis 11 and any longitudinal support beams (not shown) used in the construction of the fuselage 12. Each of the EA beam members 30 has a repeating conusoidal pattern that is non-uniform in its cross section along its depth, with the repeating pattern of conical geometry having alternating large and small radii as best shown in FIG. 3C. Example performance benefits of the improved beam design are described below with reference to FIG. 5, while an example woven hybrid material construction of the cell core structure 25 used to construct the EA beam members 30 is described below with reference to FIG. 6.

Referring to FIG. 2, the fuselage 12 of FIG. 1 is shown in cross-sectional view taken with respect to line 2-2 of FIG. 1. For illustrative clarity, the tail 15 and stabilizers 18 of FIG. 1 are omitted from FIG. 2. The fuselage 12 includes an annular fuselage skin 120 defining an aircraft interior 22 having an inner wall 21. The fuselage 12 may be fabricated as an upper fuselage 12U and a lower fuselage 12L and fastened together at a fuselage joint 17, e.g., via a floor attachment longeron. Passenger seats 23 or other cargo may be arranged with respect to the floor 20 within the interior 22.

In the example embodiment of FIG. 2, a hold 24 may exist below the floor 20, with the hold 24 having a hold floor 39 and side walls 38. The construction of the hold 24 will vary with its purpose, e.g., transporting fuel, luggage, equipment, landing gear, and the like. The EA beam members 30 with the conusoidal cell core structure 25 in this embodiment extend laterally across the interior 22 beneath and proximate to the floor 20 to support the load of the floor 20 in an example embodiment. In other embodiments, such as a rotary aircraft or helicopter, the floor 20 may be attached directly to the annular fuselage skin 120 below the floor 20.

Referring to FIGS. 3A and 3B, the conusoidal cell core structure 25 noted above has a length L, a width W, and depth D. The length L extends across the width of the fuselage 12 of FIG. 1 just below the floor 20, the depth D is the distance the conusoidal cell core structure 25 extends downward away from the floor 20, and the width W is the dimension extending along the longitudinal axis 11 shown in FIG. 1. The size of the EA beam member 30 will vary with the particular aircraft 10 in which with the EA beam member 30 is used, but may be about 9-12" in depth (D) and 6-10" in width (W) in an example embodiment, with a length (L) that corresponds to the width or diameter of the fuselage 12 of FIG. 1 less any necessary attachment structure used to connect the ends of the EA beam member 30 to the fuselage 12.

The geometry of the conusoidal cell core structure 25 of the EA beam member 30 is based on a "right-side-up and upside down" set of half-cones 26A, 26B each having a distal point $P_D$ and placed in an alternating and repeating pattern as shown in FIGS. 3A and 3B. Larger and smaller radii are thus present at a first/top edge 33 of the conusoidal cell core structure 25, with "top" referring to the edge of the conusoidal cell core structure 25 that is proximate to the floor 20, i.e., facing toward a direction from which a crush force (arrow $F_C$ of FIG. 3B) would originate during an impact event. A second/lower edge 133 of the conusoidal cell core structure is present opposite the first/top edge 33. Distal points ($P_D$) denote the farthest points of the half-cones 26A aft of the cell core structure 25 with respect to the direction of flight (arrow DOF of FIG. 3B). Proximal points ($P_P$) denote the farthest forward points of the same half-cones 26A. When the aircraft 10 of FIG. 1 has a forward velocity component along its longitudinal axis 11 and a downward vertical velocity component orthogonal to the longitudinal axis 11, i.e., toward the floor 20, the crush and shear forces of the impact load are imparted to and absorbed by the EA beam member 30 in a particular manner as set forth below.

FIG. 3C depicts the conusoidal cell core structure 25 of FIGS. 3A and 3B in side or end view, i.e., as viewed from the beam-end perspective of FIG. 1. The forward velocity component thus presents a shear force (arrow $F_S$) in the direction of flight (arrow DOF) in the event of an impact event. The conusoidal cell core structure 25 has conusoidal cell walls 31 with dissimilar radii noted above include first/large radii $r_L$, second/small radii $r_S$, and a third/midpoint radius $r_M$, all of which are taken with respect to a vertical geometric centerline CL. The terms "large" and "small" are relative with respect to each other, i.e., the large radii $r_L$ are larger than the small radii $r_S$.

The conusoidal cell core structure 25 also defines a lean angle θ of a plane of the trailing surface 37 of the cell walls of conusoidal cell core structure 25 away from the direction of flight (arrow DOF), i.e., a plane that includes each of the distal and proximal points ($P_D$, $P_P$) of the half cones 26A shown in FIGS. 3A and 3B, that offers certain advantages in the face of multi-axial loading. For instance, rotorcraft impact scenarios typically involve both vertical and forward velocity components, and thus the conusoidal cell core structure 25 is configured to absorb energy from both the crush force (arrow $F_C$ of FIG. 3B) and the sheer force (arrow $F_S$ of FIG. 3C).

The size of the radii ($r_L$, $r_S$) can be determined via two functions. Each smaller radius $r_S$ may be constructed so that it has a size of 50% of the midpoint radius $r_M$. Each larger radius $r_L$ may be sized to 150% of the midpoint radius $r_M$, or in other words the smaller radii $r_S$ may be about 30 percent of the size of the larger radii $r_L$. In other designs, the radii $r_L$, $r_S$ are different enough with respect to each other that they form a conusoid and not a sinusoid. In an example embodiment, a size difference of as little as 10 percent may be sufficient, e.g., a smaller radii $r_S$ that is about 90 percent of the larger radii. In still another embodiment, the size difference may be in a range of between about 30 percent and 90 percent of the larger radii $r_L$. If the size difference between radii is too great, the design may become unstable. Conversely, if the size difference is too small, the design would effectively act a conventional sinusoid. Although not limited to such a size difference, a difference of at least 10 percent may be sufficient.

The lean angle θ may be calculated using the geometry of the EA beam member 30. That is, as an infinite combination of smaller radii, larger radii, and lengths are possible, there is an infinite number of possible lean angles θ, which can be calculated as follows:

$$\theta = \tan^{-1}\left(\frac{r_L - r_S}{D}\right)$$

Thus, for an example construction in which the longitudinal midpoint diameter for the conusoidal cell core structure 25 is 1.5" and the midpoint radius is 0.75", with a depth of 7.75", the lean angle θ is 5.5°. While the actual lean angle θ will vary with the design, too severe or too shallow of a lean angle can adversely affect the stability. A particular range of lean angles of about 2 degrees to about 6 degrees for an example embodiment will typically provide the required stability for typical forward velocity components.

Figure 4:
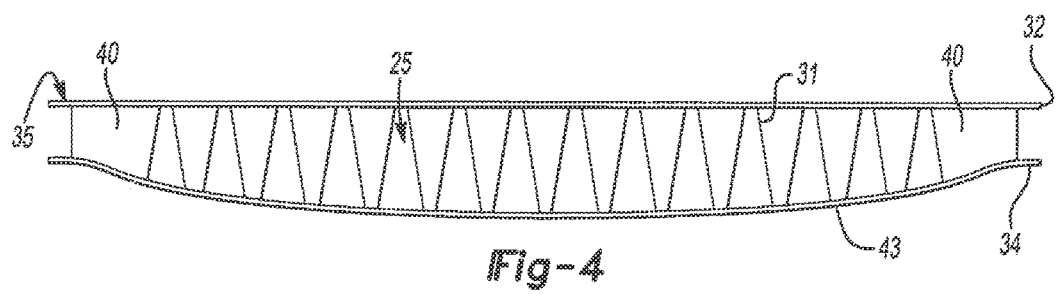
FIG. 4 is a schematic illustration of an example transverse EA beam member having the cell core structure of FIGS. 3A-C and usable as part of the aircraft shown in FIG. 1.

Referring briefly to FIG. 4, the EA beam member 30 includes the conusoidal cell core structure 25 described above with reference to FIGS. 3A-C. Additionally, the EA beam member 30 may include a first/upper plate 32 affixed to the first edge 33 of FIG. 3A and a second/lower plate 34 affixed to the second edge 133 shown in the same Figure. In a typical floor support construction, the first plate 32 is oriented with a surface 35 positioned immediately adjacent to and facing the underside of the floor 20 of FIGS. 1 and 2, and is thus ideally a substantially flat or planar flange structure along its length that is suitable for bonding or fastening of the EA beam member 30 to the floor 20.

The second plate 34 may be identically configured to the first plate 32 as shown in FIG. 2, e.g., when used above a hold 24 or otherwise attached to a solid beam or other structure having a substantially flat surface. In other embodiments such as certain rotary aircraft designs, the second plate 34 may be bonded or riveted directly to the fuselage skin 120. As the fuselage skin 120 is typically curved, the second plate 34 in such an embodiment is provided with a sufficiently curved profile along its length as shown schematically in FIG. 4, i.e., with the curvature of the second plate 34 along its length complementing or closely matching the curvature of the fuselage skin 120 so as to facilitate riveting or other direct attachment of the second plate 34 at or along a surface 43 to the fuselage skin 120. Optionally, the EA beam member 30 may also include end plates 40 or other end structure such as brackets or flanges to facilitate secure attachment of the EA beam member 30 to the fuselage 12 of FIG. 1, such as to longitudinal beam members (not shown) of the fuselage 12.

Figure 5:
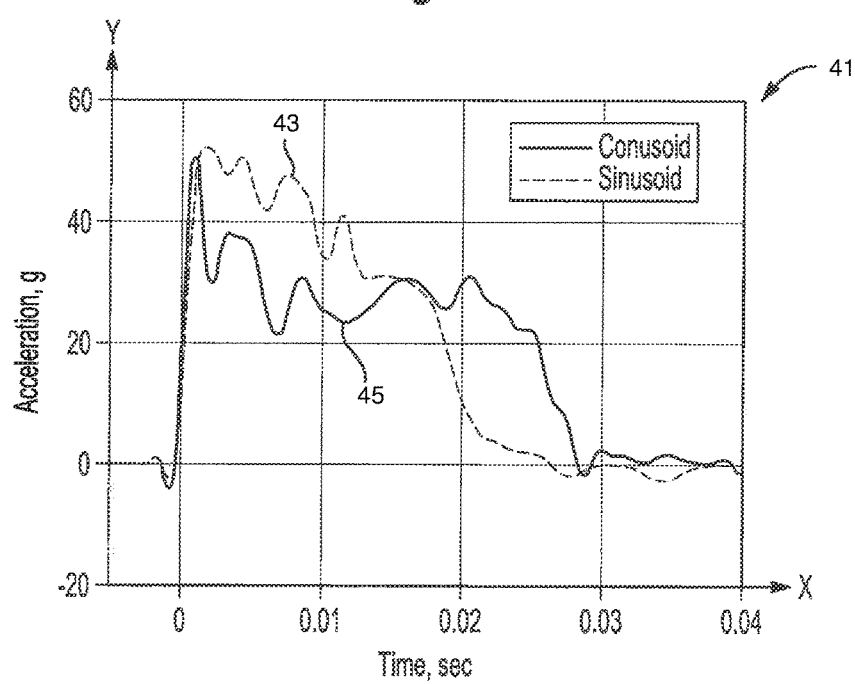
FIG. 5 is a comparative time plot of changing acceleration forces within the EA beam member and a prior art beam member, with time plotted on the x-axis and acceleration forces plotted on the vertical axis.

FIG. 5 depicts an example relative performance response 41 of a conventional sinusoidal pattern as trace 43 and the present EA beam member 30 having a conusoidal internal pattern as trace 45. Time is plotted on the x-axis while acceleration force (g) is plotted on the y-axis. As is well known in the art, the principles of energy management used in aircraft subfloor construction generally call for a large, relatively flat crush response, which is indicative of a more distributed or even pattern of energy absorption. The amount of energy absorbed in response to an impact load may be stated as EA=FΔd, where F represents the constant impact load and Δd represents the displacement of the EA beam member 30 in response to such an impact load.

An advantage of using the conusoidal cell core structure 25 shown in FIGS. 3A-C is the particular manner in which it tends to fail in response to an incident impact load. Because of the alternating large and small radii shown in FIGS. 3A-3C, there is an inherent trigger mechanism or intentionally included flaw or weak point in the conusoidal cell core structure 25 that will initiate a desired crush response. The trigger mechanism in turn minimizes the initial energy spike at the onset of the impact event. The geometry and materials used to form the EA beam member 30 thus enable a folding-type of failure to occur wherein the cell walls 31 of the conusoidal cell core structure 25 collapse or "accordion in" upon themselves. This particular failure mode is considered desirable because it is highly repeatable and consistent.

In the comparison of FIG. 5, the sinusoidal specimen has single radii of 0.75". The trajectory of trace 45 shows that the alternating large and small radii of the conusoidal design coupled with the lean angle θ exhibits a lower sustained impact response and is more plateau-shaped for a longer response time. By way of contrast, trace 43 peaks at approximately 50 g and continually drops off. Thus, the area under the respective traces 43 and 45 and the flatter response of trace 45 is indicative of the energy-absorbing properties of the EA beam structure 30 described above.

Figure 6:
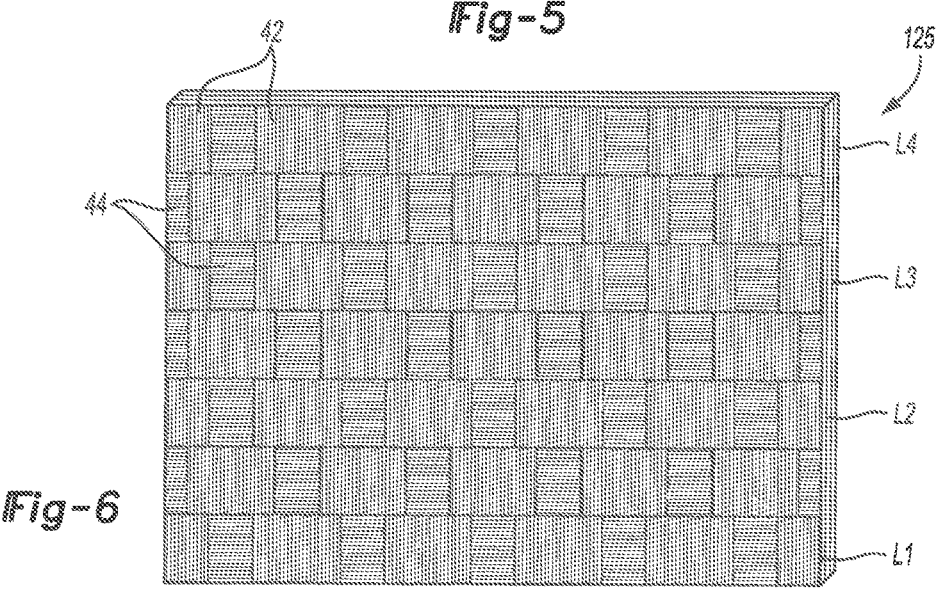
FIG. 6 is a schematic plan view illustration of an example woven fiber construction design usable in constructing the cell core structure shown in FIGS. 3A-C.

With respect to the construction of the EA beam member 30, FIG. 6 shows an example woven cell core structure 125. In such an embodiment, a hybrid weave of different fiber materials and weave directions can be used to provide a desired stiffness and level of deformation. For instance, carbon fiber 42 may be woven in a carbon/aramid fiber plain weave with the carbon fibers 42 oriented in the warp direction, i.e., vertically as FIG. 6 is viewed, and KEVLAR or other aramid fibers 44 oriented in the fill direction or horizontally. Thus, the respective longitudinal axes of the carbon and aramid fibers 42 and 44 are orthogonally arranged with respect to each other. As is well known in the art, the term "weave" in the textile industry describes an interlacing of warp and fill material, with a plain weave being the particular design shown in FIG. 6 that is biased to the warp direction. Another example set of materials is carbon and SPECTRA twill weave. Alternatively, plain or basket weaves may also be used as a pseudo-hybrid material, e.g., by creating laminates with alternating layers of full carbon and full aramid weaves. Other embodiments may be contemplated by one of ordinary skill in the art within the intended inventive scope.

The woven cell core structure 125 may be formed in multiple layers as shown, e.g., four different layers L1, L2, L3, and L4, with the angular orientation of each of the layers L1-L4, with respect to the respective longitudinal directions of fibers 42 and 44, being rotated ±45 degrees with respect to the prior layer for increased strength and performance. For example, layer L2 may be rotated clockwise 45 degrees with respect to an angular orientation of layer L1, layer L3 may be rotated counterclockwise 45 degree with respect to layer L2 such that layers L1 and L3 have the same angular orientation. Layer L4 would have the same angular orientation as layer L2 in this embodiment. Thus, as viewing FIG. 6, the four layers L1-L4 would alternate ±45 degrees at each successive layer.

The folding response noted above with reference to FIG. 5 arises largely from the ductility of the aramid fibers 44. The aramid fibers 44 tend to hold any broken carbon fibers 42 together, and in turn the carbon fibers 42 provide the desired amount of stiffness. Thus, the beneficial properties of each of the composite materials used in the example woven design of FIG. 6 are used to the overall performance advantage of the EA beam member 30.

The conusoidal cell core structure 25 noted above may be formed in an exemplary process via a wet layup of the fabric. For instance, the various layers L1-L4 of the woven cell core structure 125 of FIG. 6 may be placed in polypropylene to facilitate removal of the specimen after curing, and coated with an epoxy resin and treated with a suitable hardener, e.g., WEST SYSTEM 105 and WEST SYSTEM 206, respectively. A conusoidal form mold of suitable length, height, and depth for the application may be used to form the layup of fabric, with the mold and the layup of fabric thereafter placed in a vacuum bag and subjected to a vacuum for a sufficient length of time. The resultant conusoidal cell core structure 25 may thereafter be left to cure at room temperature. Once removed from the mold, excess edge material may be removed and the edges ground flat to a level suitable for adhesion of the first and second plates 32 and 34 shown in FIG. 4. The plates 32 and 34 may be formed in place with the conusoidal cell core structure 125 in another embodiment.

As used herein, the terms "a," "an," "the," "at least one," and "one or more" indicate that at least one of the items is present. A plurality of such items may be present unless the context clearly indicates otherwise. The term "about" indicates that the stated numerical value allows some slight imprecision, tolerance, or the like. If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. When the terms first, second, third, fourth, etc., are used to differentiate various items from each other, these designations are merely for convenience and do not limit the items.

While the best modes for carrying out the disclosure have been described in detail, those familiar with the art to which this disclosure relates will recognize various alternative designs and embodiments for practicing the invention within the scope of the appended claims.

What is claimed is:

1. An energy-absorbing (EA) beam member for use in an aircraft having a fuselage and a floor, the EA beam member comprising:
   a cell core structure having cell walls, a length, a width, and a depth, wherein the cell walls collectively define a repeating conusoidal pattern of alternating respective smaller and larger first and second radii along the length of the cell core structure, and wherein the cell walls are angled away from a forward direction of flight of the aircraft at a calibrated lean angle;
   a first plate affixed to a first edge of the cell core structure along the length of the cell core structure, wherein the first plate is substantially flat such that the first plate is attachable to the floor; and
   a second plate affixed to a second edge of the cell core structure along the length of the cell core structure opposite the first edge.

2. The EA beam member according to claim 1, wherein the second plate is curved along a length of the second plate.

3. The EA beam member according to claim 1, wherein the calibrated lean angle is greater than about 2 degrees.

4. The EA beam member according to claim 1, wherein the smaller first radii are no more than about 90 percent of the larger second radii.

5. The EA beam member according to claim 1, wherein the cell core structure is constructed of woven materials.

6. The EA beam member according to claim 5, wherein the woven materials include carbon fiber and aramid fiber arranged in a plurality of different layers, and wherein respective longitudinal axes of the carbon and aramid fibers are orthogonal with respect to each other.

7. An energy-absorbing (EA) beam member for use in an aircraft having a fuselage with an annular fuselage skin and a floor, the EA beam member comprising:
   a cell core structure having cell walls constructed of woven carbon and aramid fibers, a length, a width, and a depth, wherein the cell walls collectively define a repeating conusoidal pattern of alternating respective smaller and larger first and second radii along the length of the cell core structure, and wherein the cell walls are angled away from a forward direction of flight of the aircraft at a calibrated lean angle of at least about 2 degrees;
   a first plate connected to a first edge of the cell core structure along the length of the cell core structure, wherein the first plate is substantially flat; and
   a second plate connected to a second edge of the cell core structure along the length of the cell core structure opposite the first edge;
   wherein the first radii are about 30 percent to about 90 percent of the second radii.

8. The EA beam member according to claim 7, wherein the woven carbon and aramid fibers are arranged in at least four different layers.

9. The EA beam member of claim 8, wherein in each of the four different layers the carbon fibers are oriented in a warp direction and the aramid fibers are oriented in a fill direction.

10. The EA beam member of claim 9, further comprising a pair of end plates configured for attachment to the fuselage.

11. The EA beam member of claim 10, wherein one of the end plates is flat along its length and the other one of the end plates is curved along its length.

12. An aircraft comprising:
   a fuselage having a width and a length;
   a floor; and
   an energy-absorbing (EA) beam member positioned proximate to the floor and having a cell core structure, wherein the cell core structure has a length oriented along the width of the fuselage, a width oriented along the length of the fuselage, and a depth extending away from the floor, and also includes cell walls that collectively define a repeating conusoidal pattern of alternating respective smaller and larger first and second radii along the length of the cell core structure, and wherein the cell walls slope away from a forward direction of flight of the aircraft at a calibrated lean angle.

13. The aircraft according to claim 12, wherein the calibrated lean angle is greater than about 2 degrees.

14. The aircraft according to claim 12, wherein the smaller first radii are at least 10 percent of the size of the larger second radii.

15. The aircraft according to claim 12, wherein the EA beam member is connected to the floor to form a support structure for the floor.

16. The aircraft according to claim 12, wherein the cell core structure is constructed of woven materials.

17. The aircraft according to claim 16, wherein the woven materials include carbon fiber.

18. The aircraft according to claim 16, wherein the woven materials include aramid fiber.

19. The aircraft according to claim 16, wherein the woven materials include carbon fiber and aramid fiber arranged in a plurality of different layers, and wherein respective longitudinal axes of the carbon and aramid fibers are orthogonally arranged with respect to each other.

20. The aircraft according to claim 12, wherein the EA beam member includes a first plate and a second plate, the cell core structure includes first and second edges affixed to the respective first and second plates, the first plate is connected to the floor, and the second plate is connected to the fuselage.

* * * * *